United States Patent [19]

de Wit et al.

[11] Patent Number: 5,426,143

[45] Date of Patent: Jun. 20, 1995

[54] THERMOCHROMIC INFRARED DYES

[75] Inventors: Paulus P. de Wit, Westervoort; Erwin W. P. Erdhuisen, Duiven, both of Netherlands; John Griffiths, Garforth, Great Britain; Kasali A. Bello, Zaria, Nigeria

[73] Assignee: Akzo Nobel N.V., Arnhem, Netherlands

[21] Appl. No.: 183,467

[22] Filed: Jan. 19, 1994

[30] Foreign Application Priority Data

Jan. 21, 1993 [EP] European Pat. Off. ............ 93200150

[51] Int. Cl.⁶ .................................................. C08K 5/16
[52] U.S. Cl. .................................................. 524/206
[58] Field of Search ...................... 524/206; 106/23 H; 430/945

[56] References Cited

U.S. PATENT DOCUMENTS 4,666,819  5/1987  Elmasry ........................... 430/270

FOREIGN PATENT DOCUMENTS 287377  10/1988  European Pat. Off. ... C07C 121/84
478052   4/1992  European Pat. Off. ....... G11B 7/24

OTHER PUBLICATIONS

J. Chem. Soc. Perkin Trans. II, 1987, pp. 815–818.
J. Organic Chem., vol. 42, No. 2, 1977 pp. 297–330.
J. Am. Chem. Soc., vol. 97, 1975, pp. 901–902.
J. Org. Chem., vol. 41, No. 5, 1976, pp. 831–836.

*Primary Examiner*—Joseph L. Schofer
*Assistant Examiner*—Wu C. Cheng
*Attorney, Agent, or Firm*—Richard P. Fennelly; Louis A. Morris

[57] ABSTRACT

The invention is in the field of intrinsically thermochromic material. We have found that infrared absorbing dyes of the azamethine type have intrinsically thermochromic properties. The use of said dyes as thermochromic material has the advantage that they can be thermally activated by infrared irradiation. Irradiation of such material with a laser causes a color change that can be used in imaging and optical data storage.

The thermochromic dyes can be mixed with polymeric material and from the resulting polymer composition films can be made. If the dye contains polymerizable groups, it may be covalently incorporated into the polymer.

2 Claims, No Drawings

THERMOCHROMIC INFRARED DYES

The invention is in the field of intrinsically thermochromic material. Intrinsically thermochromic molecules are chromophores which are chemically altered on heating without the need for an external reagent, and which change colour in the process. Commercial thermochromic materials are not intrinsically thermochromic and thus depend for their thermochromicity either on liquid crystals, or on pH indicator dyes which respond to a thermally induced pH change of the environment. A few intrinsically thermochromic dyes are mentioned in G. H. Brown's *Photochromism*, Wiley Interscience, New York, 1971. However, said dyes are not infrared light absorbing.

We have found that infrared absorbing dyes of a certain type have intrinsically thermochromic properties. The use of said dyes as thermochromic material has several advantages. The fact that they are infrared absorbing has the advantage that they can be thermally activated by infrared irradiation, for instance by means of a solid state laser ($\lambda=750$ to 870 nm). The advantage of solid state lasers over other lasers is that they are small in size and relatively inexpensive. Irradiation of such material with a diode laser causes a colour change that can be used in imaging and optical data storage.

In EP-0 478 052 liquid crystalline polyester films are disclosed for optical data storage which also contain infrared dyes. In these films however, information is written by locally changing the liquid crystalline phase into an isotropic phase in the film. The infrared dye in these liquid crystalline polyester films is only used to make the film infrared sensitive and not as thermochromic material.

The present invention refers to the use of infrared dyes according to formula 1:

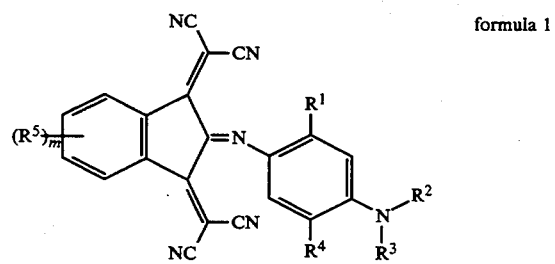

formula 1 wherein:

$R^1$ represents a hydrogen atom, —NH(O)CCH$_3$, —O(O)—O—CH$_3$, —C(O)—O—C$_2$H$_5$, —O—C(O)—CH$_3$, —O—C(O)—C$_2$H$_5$, $R^2$ represents an alkyl group having 1 to 12 carbon atoms, an aromatic group having 1 to 12 carbon atoms, an alkanol group having 1 to 12 carbon atoms, —R$^6$—CN, —R$^6$—O—C(O)—CH$_3$, an alkene group having 1 to 12 carbon atoms, a (meth)acrylate ester group having 1 to 12 carbon atoms, an epoxy group-containing alkyl group having 1 to 12 carbon atoms, polyesters of the above-mentioned diols, polyurethanes of the above-mentioned diols, poly(meth)acrylates of the above-mentioned (meth)acrylates, polyolefins, polystyrenes or polyvinylethers of the above-mentioned alkenes, polyethers of the above-mentioned epoxies, $R^3$ may represent the same groups as $R^2$, but may be chosen independently from $R^2$, $R^4$ represents a hydrogen atom, —O—CH$_3$, —O—C$_2$H$_5$, may be chosen independently and represent —Cl, —Br, —F, an alkyl group having 1 to 12 carbon atoms, an alkoxy group having 1 to 12 carbon atoms, an alkenyl group having 1 to 12 carbon atoms, —SO$_3$H, a —C=CH—HC=CH— group which is bonded to the 2 and 3 position of the benzene ring, $R^6$ represents an alkylene group having 1 to 12 carbon atoms, m is an integer from 0 to 4, as intrinsically thermochromic material.

The use of said infrared dyes has a further advantage in that the thermochromic reaction occurs at a relatively low temperature, viz. at temperatures in the range of 100°–190° C., depending on whether the dye is in a solvent or film or without a medium. Analogous reactions of phenylbutadienes and phenylazabutadienes, as described in *J. Org. Chem.*, Vol. 42, No. 2, 1977, pp. 297–300, *J. Am. Chem. Soc.*, Vol. 97, 1975, pp. 901–902, and *J. Org. Chem*, Vol. 41, No. 5, 1976, pp. 831–836, generally require temperatures of the order of 450° C. in order to proceed. The relatively low reaction temperature required here ensures that thermal degradation of the dye during irradiation by means of a laser occurs hardly if at all.

The thermochromic dyes can be mixed with polymeric material and from the resulting polymer composition films can be made, e.g., by dissolving the polymer and dye in a solvent and then applying the whole to a carrier to form a 2–20 micrometers thick film suitable for data storage. Alternatively, it is possible to produce a film made up of more than one layer. The solvent may be removed by heating the formed film for some time. Of course, the drying temperature should not exceed the temperature at which the thermochromic reaction takes place. When said films are irradiated with a laser, a thermochromic reaction occurs which produces localized changes in the colour of the film. During this reaction the infrared dyes according to formula 1 are converted into the analogous compounds according to formula 2a of 2b:

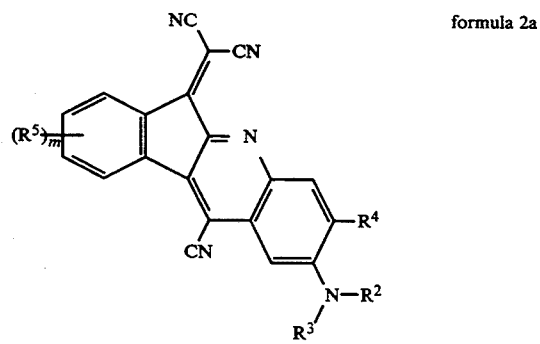

formula 2a

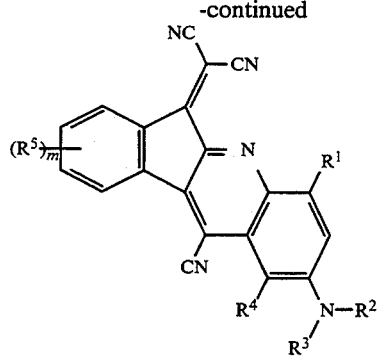

formula 2b wherein:

- R¹ represents a hydrogen atom, —NH(O)CCH₃, —C(O)—O—CH₃, —C(O)—O—C₂H₅, —O—C(O)—CH₃, —O—C(O)—C₂H₅,
- R² represents an alkyl group having 1 to 12 carbon atoms, an aromatic group having 1 to 12 carbon atoms, an alkanol group having 1 to 12 carbon atoms, —R⁶—CN, —R⁶—O—C(O)—CH₃, an alkene group having 1 to 12 carbon atoms, a (meth)acrylate ester group having 1 to 12 carbon atoms, an epoxy group-containing alkyl group having 1 to 12 carbon atoms, polyesters of the above-mentioned diols, polyurethanes of the above-mentioned diols, poly(meth)acrylates of the above-mentioned (meth)acrylates, polyolefins, polystyrenes or polyvinylethers of the above-mentioned alkenes, polyethers of the above-mentioned epoxies,
- R³ may represent the same groups as R², but may be chosen independently from R²,
- R⁴ represents a hydrogen atom, —O—CH₃, —O—C₂H₅,
- R⁵ may be chosen independently and represent —Cl, —Br, —F, an alkyl group having 1 to 12 carbon atoms, an alkoxy group having 1 to 12 carbon atoms, an a alkenyl group having 1 to 12 carbon atoms, —SO₃H, a —C=CH—HC=CH—group which is bonded to the 2 and 3 position of the benzene ring,
- R⁶ represents an alkylene group having 1 to 12 carbon atoms,
- m is an integer from 0 to 4.

If the dye contains polymerizable groups, i.e., R² and/or R³ is an alkanol, a (meth)acrylate ester, an alkene group or an epoxy group-containing alkylene group) it may be covalently incorporated into the polymer. Covalently binding the dye to the polymer has advantages in that it prevents segregation of the dye.

Depending on the absorption maximum of the initial dye, information is registered as an image with a colour deviating from its background, and the process is irreversible. The invention is also directed to optical data storage films comprising a compound according to formula 2a or 2b.

In principle, all film-forming polymers are suitable to serve as a film medium for the thermochromic dyes. Examples of such polymers include polyalkylene acrylates, notably polymethylene (meth)acrylates, polycarbonates, polyesters, polyurethanes, polystyrenes, polyimides, cellulose acetate. There is no need to use expensive liquid crystalline polymers as a film medium for the thermochromic dyes. The present invention is also directed to a optical data film comprising a non-liquid crystalline polymer and an infrared dye according to formula 1.

Written information can also be read by spectroscopical means: in this case local decreases of infrared absorption may be monitored.

The invention will be illustrated with reference to several unlimitative examples below.

EXAMPLES

Example 1

An azamethine dye according to formula 3 prepared as described in *J. Chem. Soc. Perkin Trans II*, 1987, pp.815–818, has an intense absorption band in the near infrared ($\lambda_{max}$: 794 nm, $\epsilon_{max}$: 39 800 l.mole⁻¹.cm⁻¹ in CH₂Cl₂), giving near colourless solutions.

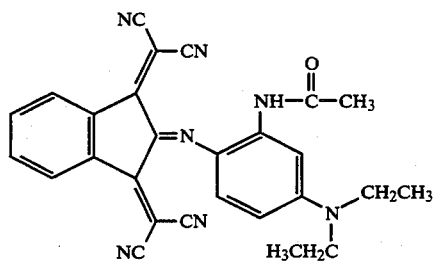

formula 3

When heated in p-xylene at 135° C. for 1 hour, the very pale green solution turned deep blue, and on cooling dark crystals according to formula 4 precipitated. The solid, obtained in 80% yield, showed $\lambda_{max}$: 629 nm in CH₂Cl₂, and the structure was confirmed by infrared elemental analysis and mass spectrometry (C₂₆H₂₀N₆O; m/Z =432).

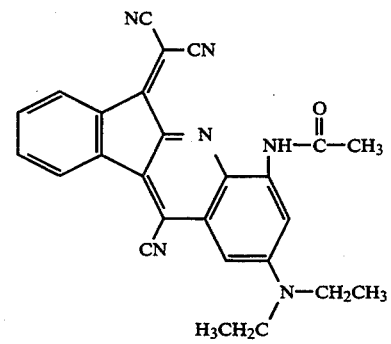

formula 4

Example 2

An azamethine dye according to formula 5 prepared as described in *J. Chem. Soc. Perkin Trans II*, 1987, pp. 815–818, has a $\lambda_{max}$: 745 nm in THF and $\epsilon$:25 200 l.mole⁻¹.cm⁻¹ (in THF).

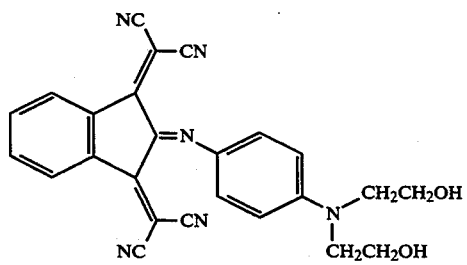

formula 5

The dye was converted quantitatively to a compound according to formula 6 ($\lambda_{max}$: 564 nm in THF, $\epsilon$: 17 200 l.mole$^{-1}$.cm$^{-1}$) by being heated in cyclopentanone to reflux temperature in about 1 hour and stirred for 30 minutes at this temperature.

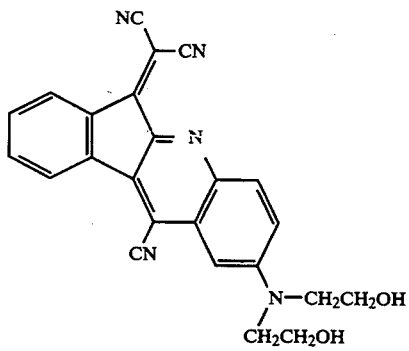

formula 6

The reaction also took place readily when the dye was dissolved in cellulose acetate film. The dye was also dissolved in a polymethylene methacrylate film with a thickness of 2 μm. On said film data was written by means of a GaAs laser ($\lambda$=825 nm, spectral line with 5 μm) with a power of 75 mW and a writing speed of 0.1 m/s. In the transparent blue film the blue colour disappeared and pale purplish lines were written.

Examples 3, 4, and 5

Three azamethine dyes according to formula 7 were prepared as described in *J. Chem. Soc. Perkin Trans II*, 1987, pp.815-818:

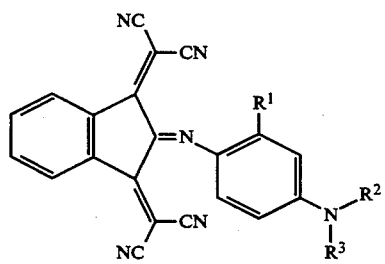

formula 7 wherein $R^1$, $R^2$ and $R^3$ have the meaning of the groups listed in TABLE I.

TABLE I

| Example No. | $R^1$ | $R^2$ | $R^3$ | $\lambda_{max}$ (CH$_2$Cl$_2$) (nm) | $\epsilon_{max}$ (CH$_2$Cl$_2$) (1·mole$^{-1}$·cm$^{-1}$) |
|---|---|---|---|---|---|
| 3 | —H | —CH$_3$ | —CH$_3$ | 755 | 25 500 |
| 4 | —H | —CH$_2$CH$_3$ | —CH$_2$CH$_3$ | 762 | 30 100 |
| 5 | —NH(O)CCH$_3$ | —C$_3$H$_7$ | —C$_3$H$_7$ | 800 | 41 800 |

On heating in various solvents at temperatures above ca. 100° C., all three dyes reacted smoothly to give compounds according to formula 8. The reaction also took place readily when the dyes were dissolved in cellulose acetate film.

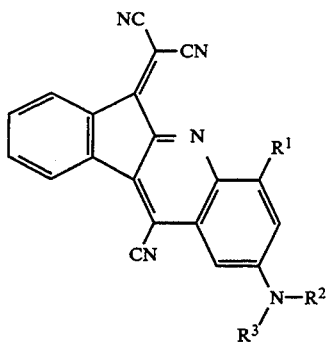

formula 8 wherein $R^1$, $R^2$ and $R^3$ have the meaning of the groups listed in TABLE I.

We claim:

1. Optical data storage film comprising a non-liquid crystalline polymer and an infrared dye according to formula 1:

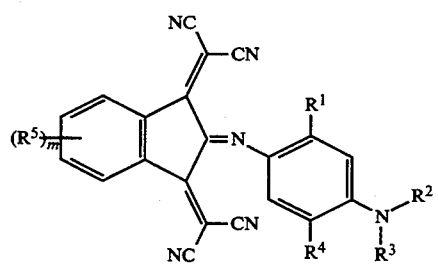

(formula 1)

wherein:

$R_1$ represents a hydrogen atom, —NH(O)CCH$_3$, —C(O)—O—CH$_3$, —C(O)—O—C$_2$H$_5$, —O—C(O)—C$_2$, O—C(O)—C$_2$H$_5$, $R_2$ represents an alkyl group having 1 to 12 carbon atoms, an aromatic group having 1 to 12 carbon atoms, an alkanol group having 1 to 12 carbon atoms, —R$^6$—CN, —R$^6$—O—C(O)—CH$_3$, an alkene group having 1 to 12 carbon atoms, a (meth)acrylate ester group having 1 to 12 carbon atoms, an epoxy group-containing alkyl group having 1 to 12 carbon atoms, polyesters of the above-mentioned diols, polyurethanes of the above-mentioned diols, poly(meth)acrylates of the above-mentioned (meth)acrylates, polyolefins, polystyrenes or polyvinylethers of the above-mentioned alkenes, polyethers of the above-mentioned epoxies, $R^3$ may represent the same groups as $R^2$, but may be chosen independently from $R^2$, $R^4$ represents a hydrogen atom, —O—CH$_3$, —O—C$_2$H$_5$, $R^5$ may be chosen independently and represent —Cl, —Br, —F, an alkyl group having 1 to 12 carbon atoms, an alkoxy group having 1 to 12 carbon atoms, an alkenyl group having 1 to 12 carbon atoms, —SO$_3$H, a —C=CH—HC=CH—group which is bonded to the 2 and 3 position for the benzene ring, $R^6$ represents an alkylene group having 1 to 12 carbon atoms, and m is an integer from 0 to 4.

2. Optical data storage film comprising a compound according to formula 2a or 2b:

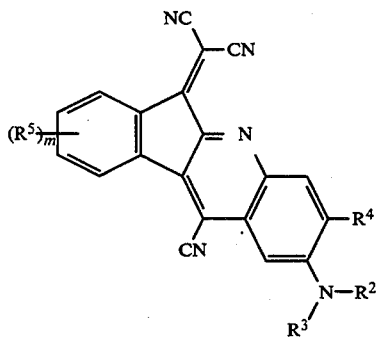

formula 2a

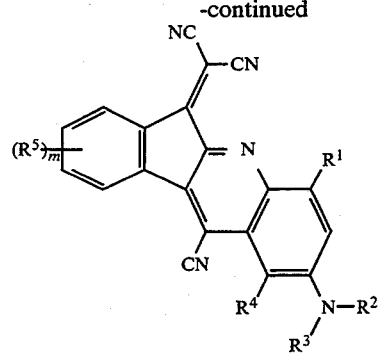

formula 2b wherein:
$R^1$ represents a hydrogen atom, —NH(O)CCH$_3$, —C(O)—O—CH$_3$, —C(O)—O—C$_2$H$_5$, —O—C(O)—CH$_3$, —O—C(O)—C$_2$H$_5$, $R^2$ represents an alkyl group having 1 to 12 carbon atoms, an aromatic group having 1 to 12 carbon atoms, an alkanol group having 1 to 12 carbon atoms, —R$^6$—CN, —R$^6$—O—C(O)—CH$_3$, an alkene group having 1 to 12 carbon atoms, a (meth)acrylate ester group having 1 to 12 carbon atoms, an epoxy group-containing alkyl group having 1 to 12 carbon atoms, polyesters of the above-mentioned diols, polyurethanes of the above-mentioned diols, poly(meth)acrylates of the above-mentioned (meth)acrylates, polyolefins, polystyrenes or polyvinylethers of the above-mentioned alkenes, polyethers of the above-mentioned epoxies, $R^3$ may represent the same groups as $R^2$, but may be chosen independently from $R^2$, $R^4$ represents a hydrogen atom, —O—CH$_3$, —O—C$_2$H$_5$, $R^5$ may be chosen independently and represent —Cl, —Br, —F, an alkyl group having 1 to 12 carbon atoms, an alkoxy group having 1 to 12 carbon atoms, an alkenyl group having 1 to 12 carbon atoms, —SO$_3$H, a —C=CH—HC=CH— group which is bonded to the 2 and 3 position of the benzene ring, $R^6$ represents an alkylene group having 1 to 12 carbon atoms, m is an integer from 0 to 4.

* * * * *

UNITED STATES PATENT AND TRADEMARK OFFICE
CERTIFICATE OF CORRECTION

PATENT NO. : 5,426,143
DATED : June 20, 1995
INVENTOR(S) : Paulus P. de Wit, et al.

It is certified that error appears in the above—identified patent and that said Letters Patent is hereby corrected as shown below:

<u>Col. 6, lines 36-37</u>, "-O-C-(O)-C$_2$" should read -- -O-C-(O)-CH$_3$--; and <u>Col. 6, line 45</u>, "polyesters" should read --polyethers--.

Signed and Sealed this

Nineteenth Day of March, 1996

Attest:

BRUCE LEHMAN

Attesting Officer

Commissioner of Patents and Trademarks